United States Patent [19]
Anderson

[11] Patent Number: 6,097,851
[45] Date of Patent: Aug. 1, 2000

[54] LOW LATENCY CORRELATION

[75] Inventor: Mark A. Anderson, Fort Collins, Colo.

[73] Assignee: Agilent Technologies, Palo Alto, Calif.

[21] Appl. No.: 09/052,852

[22] Filed: Mar. 31, 1998

[51] Int. Cl.[7] .................................................. G06K 9/62
[52] U.S. Cl. .......................... 382/278; 382/304; 382/209
[58] Field of Search .................................... 382/278, 279,
382/209, 304, 107; 348/699, 416, 420

[56] References Cited

U.S. PATENT DOCUMENTS

| | | | |
|---|---|---|---|
| 4,736,438 | 4/1988 | Persoon et al. | 382/278 |
| 4,799,055 | 1/1989 | Nestler et al. | 340/710 |
| 4,864,629 | 9/1989 | Deering | 382/278 |
| 4,972,359 | 11/1990 | Silver et al. | 382/278 |
| 5,099,325 | 3/1992 | Artieri et al. | 348/420 |
| 5,163,101 | 11/1992 | Deering | 382/278 |
| 5,173,772 | 12/1992 | Choi | 348/699 |
| 5,247,586 | 9/1993 | Gobert et al. | 382/278 |
| 5,504,931 | 4/1996 | Furtek | 348/416 |
| 5,568,203 | 10/1996 | Lee | 348/699 |
| 5,585,862 | 12/1996 | Wuertele et al. | 348/699 |
| 5,636,293 | 6/1997 | Lin et al. | 382/236 |

Primary Examiner—Amelia Au
Assistant Examiner—Jingge Wu

[57] ABSTRACT

The architecture of the inventive correlator is, in a preferred embodiment, an array of correlation cells each containing a delay pipe, a math unit and an accumulator. An array of these correlation cells are tiled together to allow simultaneous processing by all cells. The array is disposed so that each cell accumulates an output value in a result surface. There is no electrical limit to the number of correlation cells that may be tiled together. A preferred embodiment uses nine cells tiled together into a 3×3 correlation result surface. Other embodiments have been tested in accordance with the present invention having twenty-five cells tiled together into a 5×5 correlation result surface. A stream of compare pixel values is presented to the array wherein each compare pixel value is presented to each cell concurrently. A reference memory supplies the appropriate reference pixel values to the cells to enable all calculations for that compare pixel value to be done concurrently. The results of those calculations are summed in each cell's accumulator. The process is repeated for each compare pixel value in the stream. When all compare pixel values in the stream have been processed, the values in the accumulators are compared. Generally, the lowest value is accepted as the correlation value.

14 Claims, 6 Drawing Sheets

| $O_0$ | $O_1$ | $O_2$ |
|---|---|---|
| $O_3$ | $O_4$ | $O_5$ |
| $O_6$ | $O_7$ | $O_8$ |

201(TYP)

| $221_0$: | | | $221_5$: | | |
|---|---|---|---|---|---|
| $202_0$ | TAGS | $212_0$ | $202_7$ | TAGS | $212_0$ |
| $202_1$ | TAGS | $212_1$ | $202_8$ | TAGS | $212_1$ |
| $202_2$ | TAGS | $212_2$ | $202_9$ | TAGS | $212_2$ |
| $202_5$ | TAGS | $212_3$ | $202_{12}$ | TAGS | $212_3$ |
| $202_6$ | TAGS | $212_4$ | $202_{13}$ | TAGS | $212_4$ |
| $202_7$ | TAGS | $212_5$ | $202_{14}$ | TAGS | $212_5$ |
| $202_{10}$ | TAGS | $212_6$ | $202_{17}$ | TAGS | $212_6$ |
| $202_{11}$ | TAGS | $212_7$ | $202_{18}$ | TAGS | $212_7$ |
| $202_{12}$ | TAGS | $212_8$ | $202_{19}$ | TAGS | $212_8$ |

LOW LATENCY CORRELATION

TECHNICAL FIELD OF THE INVENTION

This invention relates generally to correlation of pixelated images in the digital domain, and more specifically to a correlator enabling low-latency image processing, advantageously in self-contained fashion on a digital signal processor (DSP) deployed on an integrated circuit chip.

BACKGROUND OF THE INVENTION

Devices having a tracking capability (such as a hand-held scanner) require navigation functionality in order to maintain awareness of the device's present position on a piece of work. The surface texture of the work can provide a frame of reference for navigation. A known effective technique for enabling such navigation is to shine light at an angle on the work, and to process the resulting reflection, which will include the surface texture shadow of the work. This technique enables navigation using, for example, the fiber texture on the surface of a piece of paper from which an image is being scanned.

Part of such a navigation technique is correlation. In a series of frames representing portions of the image captured during motion across the image, correlation produces a numerical representation of "how much the current frame looks like the previous frame." Deriving this numerical representation is analogous to laying a photograph slide of a current image over a negative of a reference image, and then moving the slides around until the least amount of light gets through. The numerical representation sought in correlation corresponds actually to the amount of light that actually gets through at the nadir point and thus quantifies the "best fit" between the two images.

Correlation is typically performed in the digital domain in accordance with techniques described with reference to FIGS. 1A–1D. Reference image 101 on FIG. 1A comprises, for example, a 6×6 array of reference pixels $R_0$–$R_{35}$. Each reference pixel $R_0$–$R_{35}$ will be understood to be a digital value representative of the information seen by that pixel when the image was captured. Compare image 102 on FIG. 1A comprises a 6×6 array of compare pixels $C_0$–$C_{35}$ clipped for the purposes of correlation to a 4×4 array 103. Referring now to FIG. 1B, compare array 103 is overlayed "dead center" on reference image 101, generating 16 calculations 104 as shown on FIG. 1B. In FIG. 1B, exemplary use is made in calculations 104 of the function $(R_x-C_y)^2$, although other functions of R and C may be used in correlation, such as $|R_x-C_y|$.

Figure 1A:
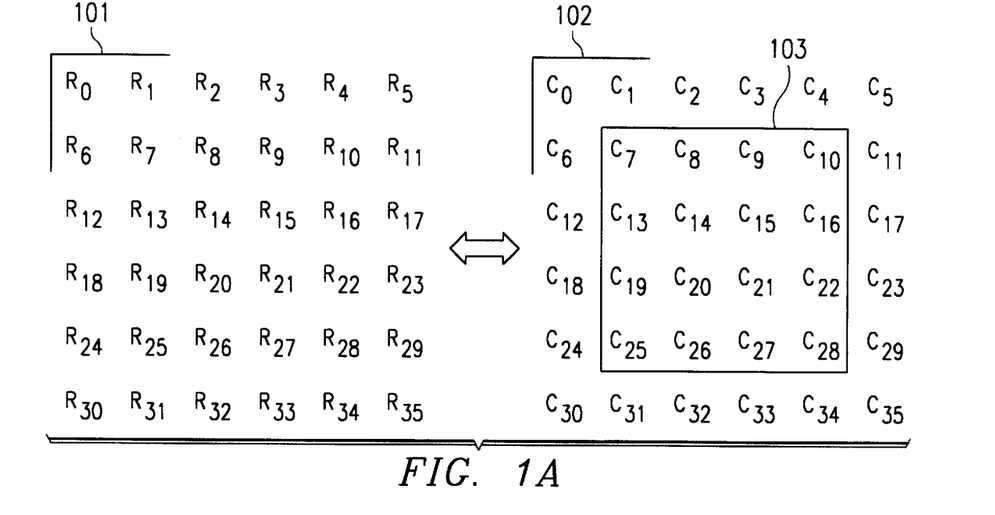
FIG. 1A depicts an exemplary reference image 101 and compare image 102 disposed for correlation according to techniques known in the art.
Figure 1B:
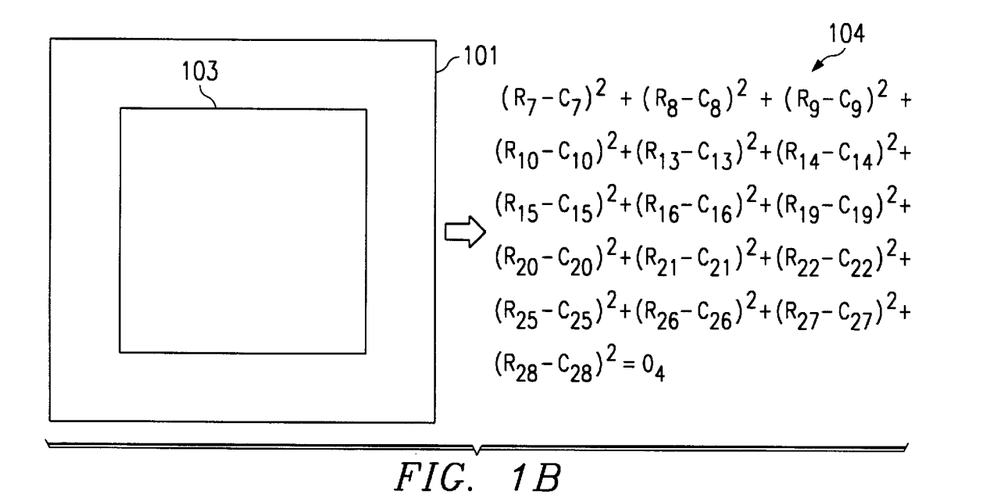
FIG. 1B depicts correlation calculations to derive output value $O_4$ on result surface 105 on FIG. 1C.
Figure 1C:
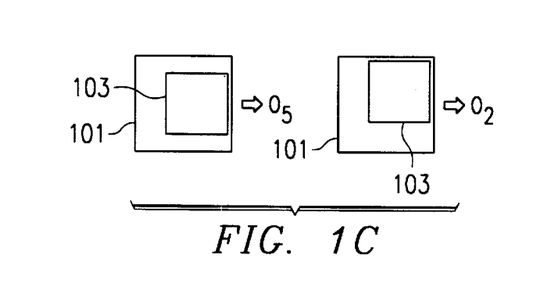
FIG. 1C depicts illustrative "movement" of array 103 on reference image 101 to derive output values $O_5$ and $O_2$ according to corresponding correlation calculations as illustrated on FIG. 1B.
Figure 1D:
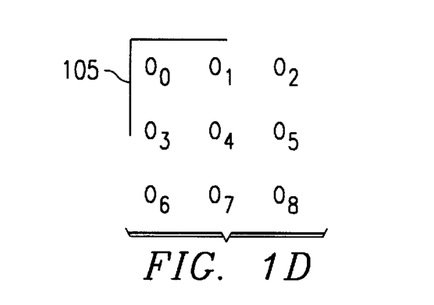
FIG. 1D depicts result surface 105 from correlation of reference image 101 and compare image 102 on FIG. 1A.

The aggregate sum of all 16 calculations 104 on FIG. 1B goes forward to form output value $O_4$ on result surface 105 depicted on FIG. 1D. With further reference to FIG. 10, result surface is typically a 3×3 array of output values $O_0$–$O_8$.

Turning now to FIG. 1C, array 103 is now overlaid, for example, on reference image 101 one reference pixel to the right of dead center. The aggregate sum of calculations 104 on FIG. 1B corresponding to this overlay yields output value 05 on result surface 105 on FIG. 1D. With further reference to FIG. 1C, array 103 is now overlaid, for example on reference image 101 one pixel diagonally up and to right of dead center. The aggregate sum of calculations 104 on FIG. 1B corresponding to this overlay yields output value $O_2$ on result surface 105 on FIG. 1D.

The result of the foregoing process is that result surface 105 on FIG. 1D comprises a series of output values $O_0$–$O_8$ each representative of correlation between array 103 and the corresponding patch of reference image 101 when array 103 is "moved around" reference image 101. The lowest value of $O_0$–$O_8$ is the "best fit" and is the correlation value for reference image 101 and compare image 102.

Although exemplary use in FIGS. 1A–1D has been made of a 6×6 reference image 101 and compare image 102 (the compare image clipped to 4×4 to facilitate "movement" over reference image 101) in order to generate a 3×3 result surface, there is no limitation on these numbers to perform correlation according to the foregoing technique. Any size of reference image and compare image may be correlated, and the amount of "movement" enabled will dictate the size (and resolution) of the result surface.

Correlators of the current art using this technique typically store entire frames of digitized input pixel values in memory and then correlate the frames using an off-chip processor. Calculations are generally done serially for each output value over the result surface, calculations for the next output value not started until the previous output value has been determined. This results in a long latency from completion of the digitization of a frame until the result surface against the previous reference frame is calculated. There is also a high hardware overhead requiring at least two memory regions for the reference frame and the compare frame.

This type of batch processing causes slowdowns that could be remediated by more of a continuous and parallel processing of correlation calculations. It would also be advantageous to be able to perform correlation on-chip, which might become more feasible if the hardware requirements were optimized.

There is therefore a need in the art to perform correlation calculations in more of a "streaming" fashion, preferably on-chip.

SUMMARY OF THE INVENTION

These and other objects, features and technical advantages are achieved by a correlator in which indexed patches of pixels on the current and reference frames are presented to correlation cells for processing in a "streaming" fashion.

The inventive correlator derives its inventive concept from recognizing, in the current examples illustrated on FIGS. 1A–1D that the pixel values in compare array 103 (pixel values $C_7$–$C_{10}$, $C_{13}$–$C_{16}$, $C_{19}$–$C_{22}$, and $C_{25}$–$C_{28}$ on FIG. 1A) are each used once and only once, in every calculation of an output value $O_0$–$O_8$. Thus, for example, if architecture is used where pixel value $C_7$ is presented to nine calculators concurrently, and the appropriate reference pixel values are sent at the same time to the calculators, the nine calculators may individually execute a different calculation in unison, where each of the calculations is one of those required to determine a corresponding one of the output values. Therefore, $C_7$ is not needed again, all of the calculations requiring $C_7$ now having been made.

Repeating this process for a stream of compare pixel values $C_7$–$C_{10}$, $C_{13}$–$C_{16}$, $C_{19}$–$C_{22}$ and $C_{25}$–$C_{28}$ (as used in the example of FIG. 1A) enables all output values $O_0$–$O_8$ to be determined simultaneously after 16 iterations of the concurrent process. This "streaming" process dramatically reduces the latency required to perform these calculations in comparison to corresponding "batch" systems of the prior art. The only difference over the prior art process described in the previous section is that according to the inventive correlator, none of the output values are known until the 16th and final iteration is complete, whereupon all output values $O_0$–$O_8$ manifest themselves concurrently. In contrast, in the prior art, calculation of one output value is generally completed before the next is started. This difference is not disadvantageous, however, since the next step in analysis of output values is typically to identify the lowest one. It does not matter, therefore, if the values of output values manifest themselves serially or concurrently, since identification of the lowest value cannot be made until all output values are known.

While the inventive correlator is used for image processing (two dimensions) in a preferred embodiment, there is no reason why its principles will not apply to n-dimensional problems.

The architecture of the inventive correlator is, in a preferred embodiment, an array of correlation cells each containing a delay pipe, a math unit and an accumulator. An array of these correlation cells are tiled together to allow simultaneous processing by all cells. The array is disposed so that each cell accumulates an output value in a result surface. There is no electrical limit to the number of correlation cells that may be tiled together. A preferred embodiment uses nine cells tiled together into a 3×3 correlation result surface. Other embodiments have been tested in accordance with the present invention having twenty-five cells tiled together into a 5×5 correlation result surface.

A stream of compare pixel values is presented to the array wherein each compare pixel value is presented to each cell concurrently. A reference memory supplies the appropriate reference pixel values to the cells to enable all calculations for that compare pixel value to be done concurrently. The results of those calculations are summed in each cell's accumulator. The process is repeated for each compare pixel value in the stream. When all compare pixel values in the stream have been processed, the values in the accumulators are compared. Generally, the lowest value is accepted as the correlation value.

It is therefore a technical advantage to speed up processing of correlation calculations by executing n calculations concurrently, where n is the number of output values expected in the result surface.

It is a further technical advantage of the present invention to speed up processing of correlation calculations by presenting compare pixel values in a stream to calculation units concurrently, sets of appropriate corresponding reference pixel values also presented to the calculation units synchronously in a stream. Such architecture enables simultaneous calculation and accumulation of output values in a streaming fashion.

It is a yet further advantage of the present invention to reduce hardware requirements for correlation by obviating the need for a designated memory region to store a frame of compare pixel values while calculation of a correlation result is in progress. By using an array of calculation cells in accordance with the present invention, the architecture may advantageously be embodied entirely on-chip in a digital signal processor (DSP).

It is a still further advantage of the present invention to optimize reference memory resources when correlating according to the invention. Reference pixel values may be "passed", when appropriate for a calculation, from one calculation cell to the next, requiring less than a complete refresh of all cells from reference memory each time a new compare pixel value is presented to all cells.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Computer architecture will be described for performing low-latency correlation in accordance with the a preferred embodiment of the present invention. While the architecture and topology described herein is fully enabling, it will be appreciated that this architecture or topology is not limiting, and any architecture and topology enabling the concurrent calculation advantages of the inventive correlator as claimed below is within the scope of the present invention.

Figure 2A:
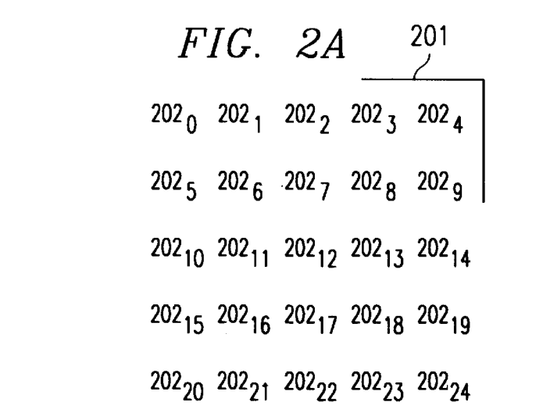
FIG. 2A depicts exemplary reference array 201 used to describe architecture enabling the inventive correlator.
Figure 2B:
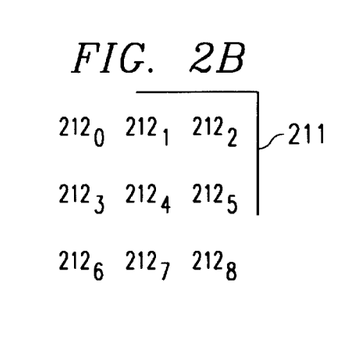
FIG. 2B depicts exemplary compare array 211 used to describe architecture enabling the inventive correlator.
Figure 2C:
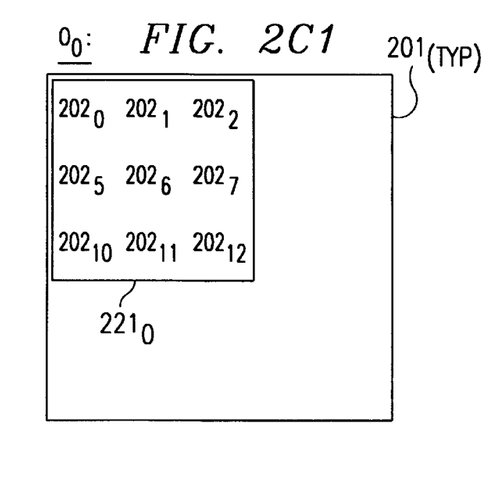
FIG. 2C depicts indexing of movement of compare array 211 over reference array 201 to patches $221_0$–$221_8$.
FIG. 2D depicts result surface 231 from correlation of compare array 211 and reference array 201 in accordance with the inventive correlator.
Figure 2C:
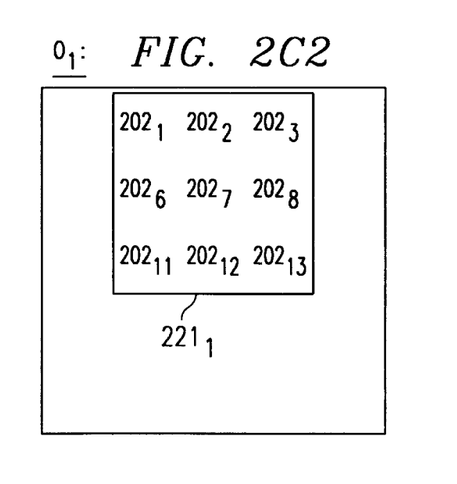
Figure 2C:
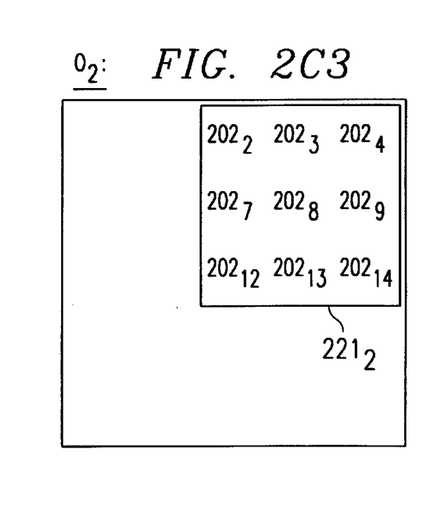
Figure 2C:
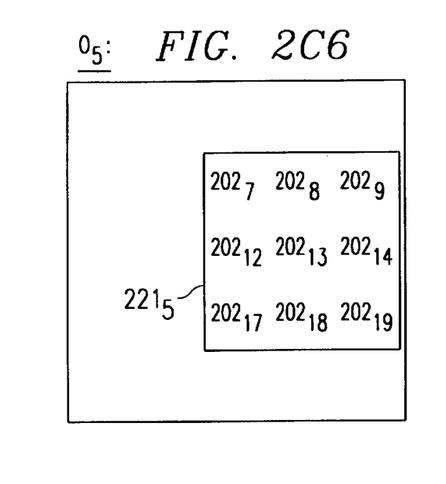
Figure 2C:
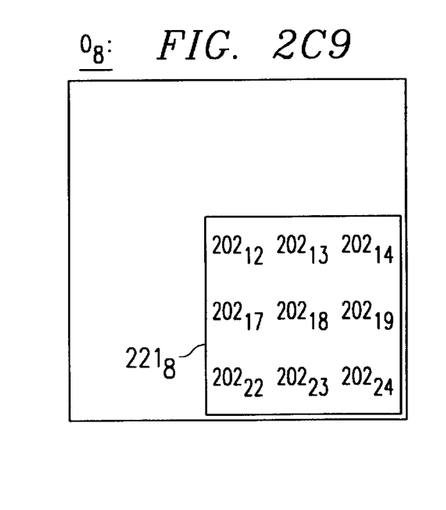
Figure 2C:
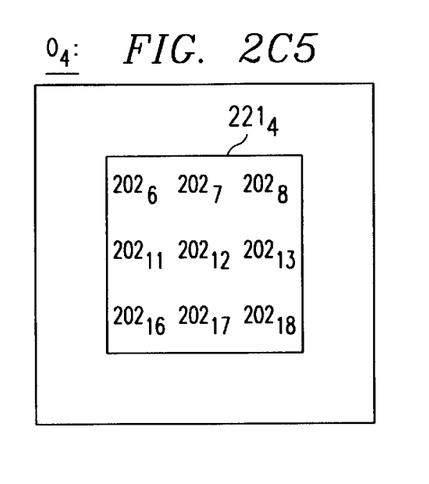
Figure 2C:
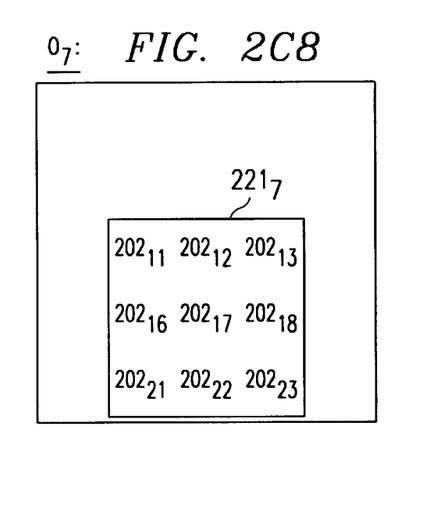
Figure 2C:
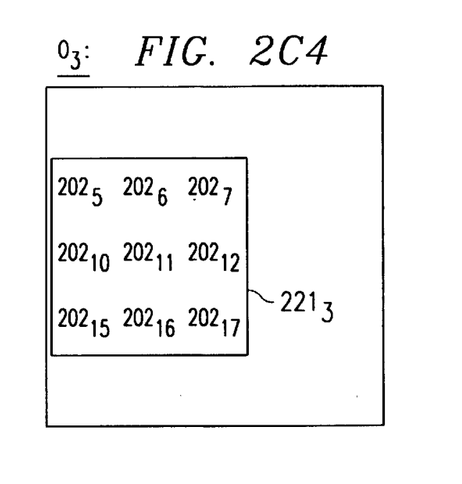
Figure 2C:
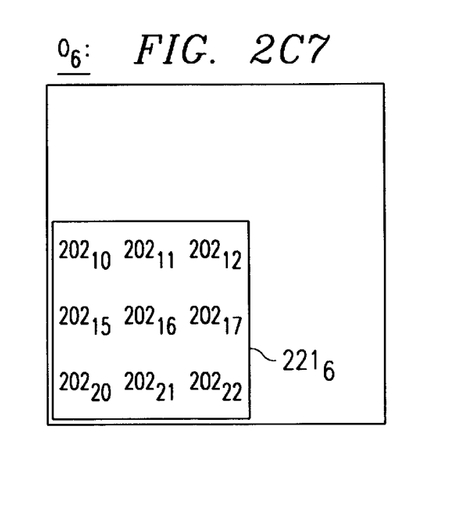

FIG. 2A illustrates a pixelated reference image represented as a 5×5 reference array 201 of reference pixel values $202_0$ through $202_{24}$, and FIG. 2B illustrates a pixelated compare image represented as a 3×3 compare array 211 of compare pixel values $212_0$ through $212_8$. FIG. 2C shows the possible patches $221_0$ through $221_8$ available when compare array 211 is overlaid on reference array 201 and moved about into all possible different locations. As shown on FIG. 2D, an output result $O_0$ through $O_8$ derived for each corresponding patch $221_0$ through $221_8$ on FIG. 2C yields a 3×3 result surface 231. Analysis of result surface 231 identifies a correlation value for the reference image represented by reference array 201 in FIG. 2A and the compare image represented by compare array 211 on FIG. 2B.

While exemplary use has been made in FIGS. 2A through 2D of a 5×5 reference array 201 and a 3×3 compare array 211, it will be appreciated that the present invention is not limited in this regard. Further, while exemplary use has been made in FIGS. 2A through 2D of 2-dimensional arrays, it will be appreciated that the invention is not limited in this regard either. According to the inventive correlator, reference array 201 and compare array 211 may be of unlimited size or dimensions. All that is required is that compare array 211 is not greater in any dimension than reference array 201, and is smaller than reference array 201 in at least one dimension. In this way, movement of compare array 211 over reference array 201 can be described with patches $221_X$ indexed to output results $O_X$ to yield result surface 231. Clearly, the smaller that compare array 211 is than reference array 201 in multiple dimensions, the more movement that can be described by indexing patches $221_X$ to output results $O_X$. The resolution of result surface 231 thus increases, result surface now having more output results $O_X$. Several factors may need to be taken into account in selecting the sizes of reference array 201 and compare array 211 to give a particular size of result surface 231. Greater compare-to-reference movement (enabled by a small compare array) increases the chances that the best correlation value will be found among the values $O_X$ on result surface 231 (and not "off the edge" of result surface 231). A compare array should nonetheless not be selected to be too small, since it needs to have sufficient pixel values to identify sufficient local features on the work surface to enable effective navigation. On the other hand, the processing to derive result surface 231 (and therefore the complexity of the embodying architecture) also increases geometrically with the number of output results $O_X$ comprising result surface 231. Selection of the size of reference array 201 and compare array 211 in a specific application is thus a balance of navigation objectives in view of the processing capacity of available hardware.

Often, reference array 201 and compare array 211 will initially be the same size, since the images they represent are likely to have been captured and pixelated by the same photo cell array. A preliminary stage to correlation in such applications is thus to make compare array 211 smaller in at least one dimension than reference array 201 by clipping or other methods standard in the art.

Figure 2D:
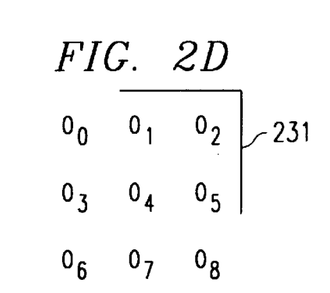
Figure 3:
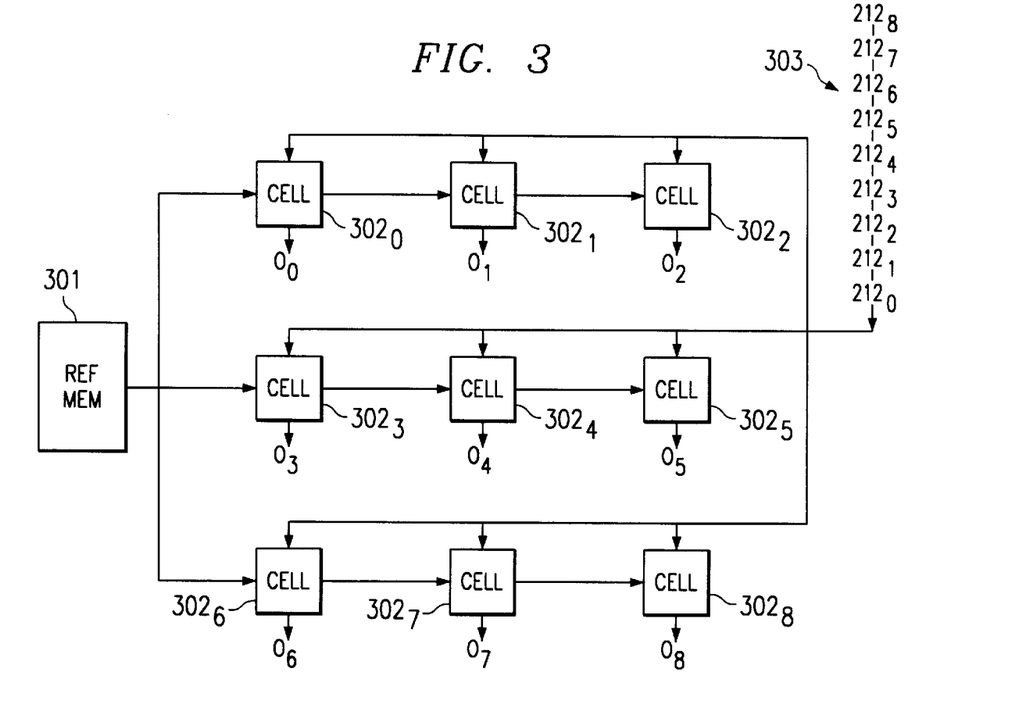
FIG. 3 depicts architecture enabling the inventive correlator.

With reference now to FIG. 3, and using the exemplary reference array 201, compare array 211, patches $221_X$ and result surface 231 described on FIGS. 2A through 2D, architecture enabling the inventive correlator comprises reference memory 301 storing reference array 201 and organizing it, in the manner illustrated on FIG. 2C, into nine separate array-sized patches $221_0$–$221_8$ of reference pixel values 202. On the other hand, a small compare array may be unable to identify sufficient features locally on which to base effective navigation.

Figure 4:
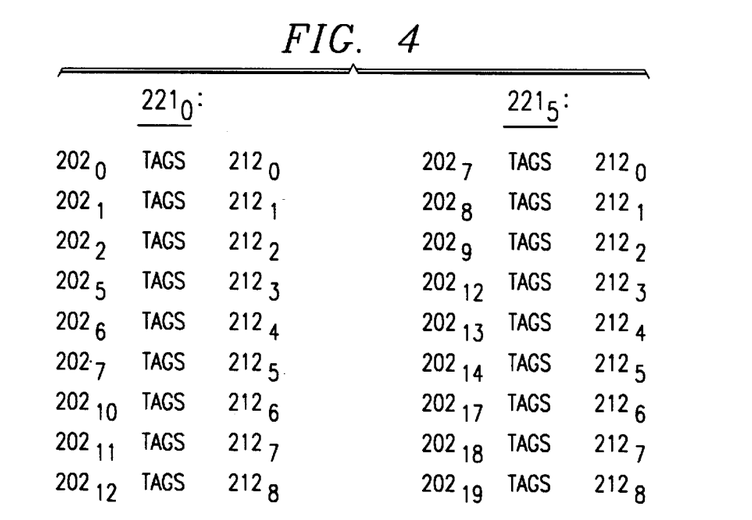
FIG. 4 illustrates "tagging" of reference pixel values 202 to compare pixel values 212 for exemplary patches $212_0$ and $212_5$.

With reference now to the table shown on FIG. 4, reference memory 301 on FIG. 3 further tags each reference pixel value 202 in each patch $221_0$–$221_8$ to its corresponding compare pixel value $212_0$–$212_8$ appearing thereabove when compare array 201 is overlaid on thereon. Comparison of FIGS. 2B and 2C verifies this. FIG. 4 shows two examples for patches $221_0$ and $221_5$, although it will be understood that this "tagging" is done in reference memory 301 on FIG. 3 for all patches $221_0$–$221_8$.

With continuing reference to FIG. 3, architecture enabling the inventive correlator further comprises nine calculation cells $302_0$–$302_8$, each cell assigned to a corresponding patch $221_0$–$221_8$. Each cell $302_0$–$302_8$ is further disposed, following calculation in accordance with the present invention, to yield a corresponding output result $O_0$–$O_8$ on result surface 231. Cells $302_0$–$302_8$ are further disposed to operate concurrently in yielding said output results $O_0$–$O_8$.

FIG. 3 further shows that all compare pixel values $212_0$–$212_8$ in compare array 211 are delivered in a series 303, wherein each compare pixel value $212_0$–$212_8$ is delivered once in series to each cell $302_0$–$302_8$. It will be further understood from FIG. 3 that individual compare pixel values $212_0$–$212_8$ in series 303, when delivered, are delivered simultaneously to all cells $302_0$–$302_8$. Although the illustration of FIG. 3 shows compare pixel values $212_0$–$212_8$ delivered in ascending order in series, it will be appreciated that the invention is not limited in this regard.

Figure 5A:
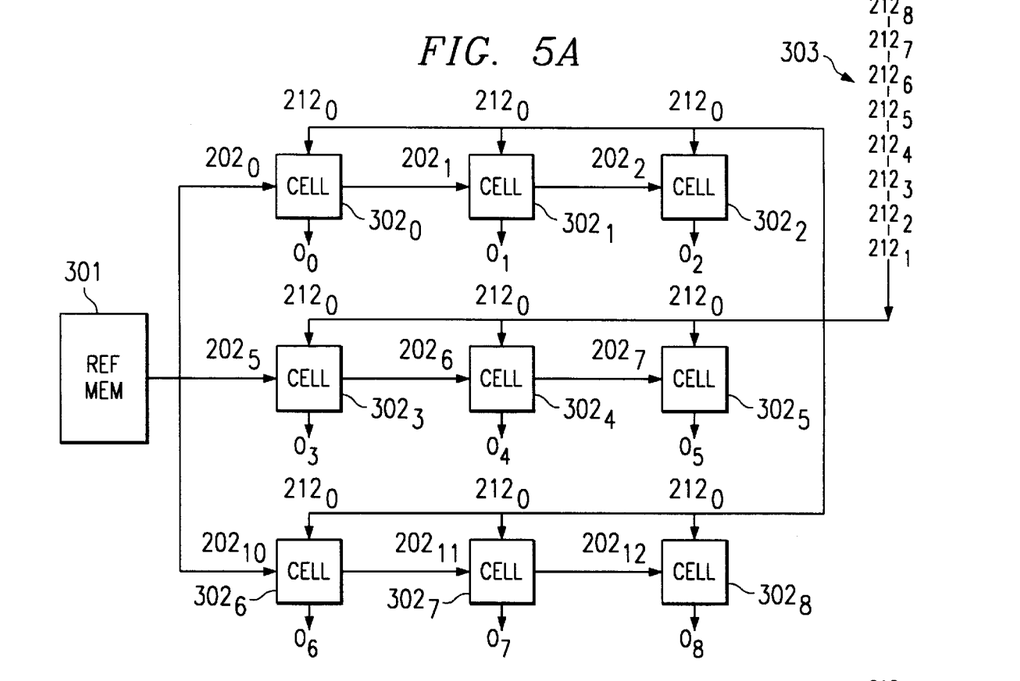
FIGS. 5A, 5B and 5C illustrate coordinated delivery of reference pixel values 202 and compare pixel values 212 in accordance with the inventive correlator.
Figure 5B:
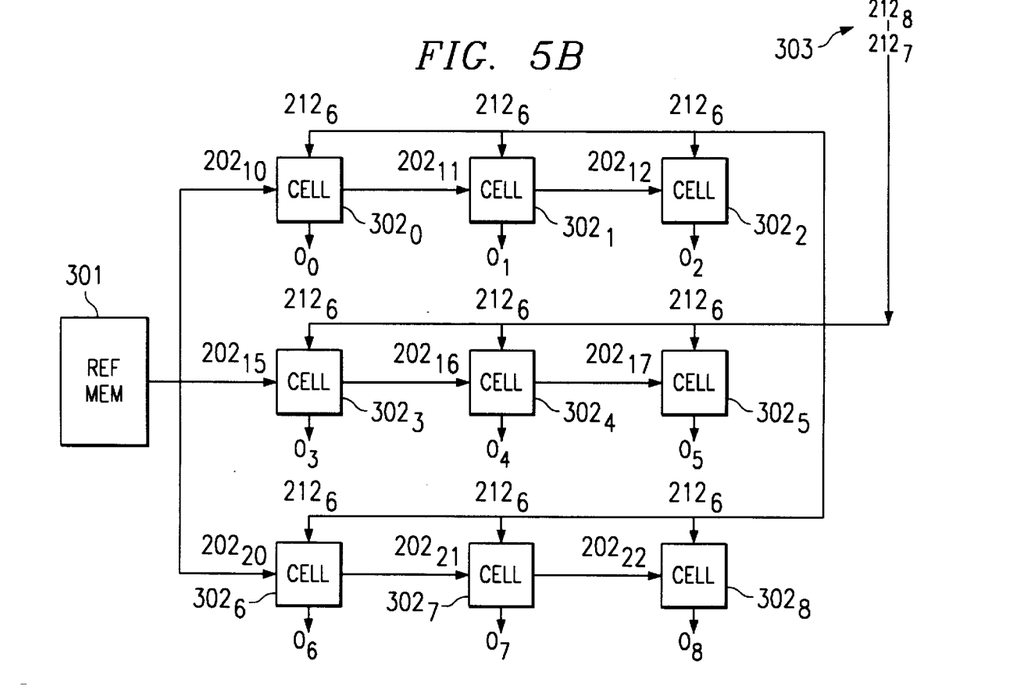
Figure 5C:
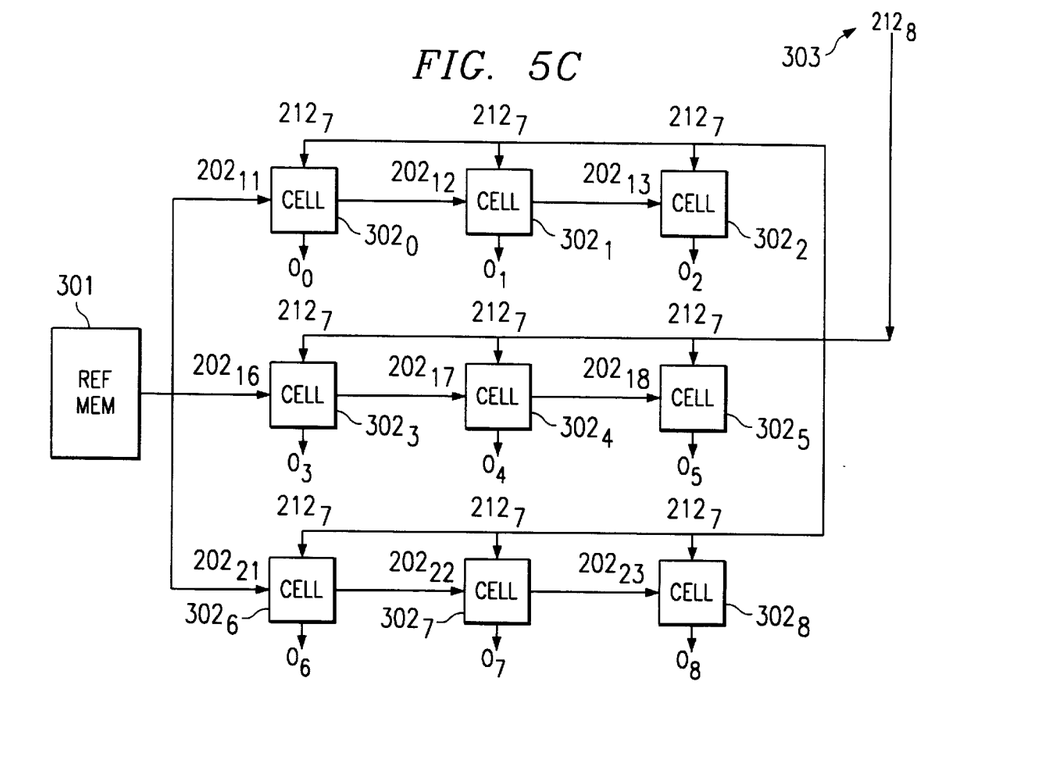

Let it now be assumed, as shown in FIG. 5A, that the first compare pixel value $212_0$ is delivered simultaneously to all cells $302_0$–$302_8$. Reference memory 301 concurrently feeds cells $302_0$–$302_8$ with corresponding tagged reference pixel values 202 for compare pixel value $212_0$. Further, it being recalled that each cell $302_0$–$302_8$ is indexed to a corresponding patch $221_0$–$221_8$, tagged reference values 202 are distributed individually to the cells $302_0$–$302_8$ indexed to the patches $221_0$–$221_8$ from which the tagged reference pixel values 202 originate. Subsequent similarly coordinated deliveries of reference pixel values 202 are shown on FIGS. 5B and 5C for compare pixel values $212_6$ and $212_7$ respectively.

Figure 6:
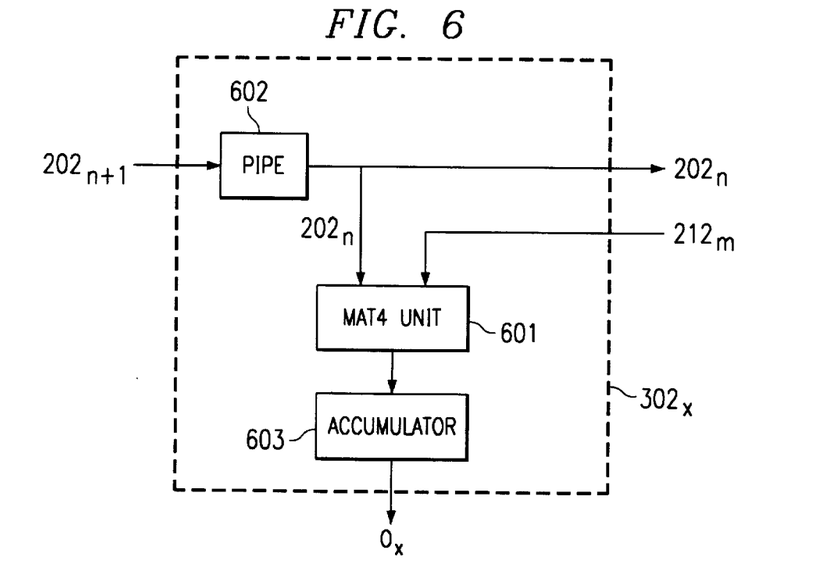
FIG. 6 depicts architecture within calculation cells $302_0$–$302_8$ in more detail.

FIG. 6 illustrates exemplary enabling architecture within each cell $302_0$–$302_8$ (referred to on FIG. 6 as $302_x$). Math unit 601 calculates "first stage results" (alternatively referred to herein as "patch values"). A first stage result is a discrete calculation of a preselected function of the tagged reference pixel value 202 fed to a cell $302_0$–$302_8$ and the corresponding compare pixel value $212_0$–$212_8$. In the example of FIG. 5A, the first stage result, or "patch value," for each patch $221_0$–$221_8$ is a preselected function of compare pixel value $212_0$ and its corresponding tagged reference pixel value 202.

It will be appreciated that the preselected function described above with reference to FIG. 6 may be any selected correlation function. For example, it may be advantageous to use known correlation functions such as (a) the absolute value of the numeric difference between a tagged reference pixel value 202 and its corresponding compare pixel value 212, or alternatively (b) the square of the numeric difference between a tagged reference pixel value 202 and its corresponding compare pixel value 212. The invention is not limited to any particular correlation function, however, and indeed enabling architecture may further allow functions to be programmable so that the function can be periodically changed.

Returning to FIG. 6, pipe 602 advantageously delays delivery of tagged reference pixel values 202 to math unit 601 until corresponding compare pixel values 212 arrive. It will be appreciated in the example of FIG. 6 that reference pixel value $202_n$ and its corresponding tagged compare pixel value $212_m$ are at math unit 601, while pipe 602 temporarily holds reference pixel value $202_{n+}$ in preparation for delivery to math unit 601 when the compare pixel value following $212_m$ arrives. Accumulator 603 in each cell $302_0$–$302_8$ receives successive first stage results from math unit 601 and sums them. It will be seen from FIGS. 3 and 5 that as series 303 is delivered to calculation cells $302_0$–$302_8$, successive corresponding tagged reference values 202 are fed to cells $302_0$–$302_8$, thereby enabling calculation of successive first stage results (or "patch values") by math unit 601. As noted, accumulator 603 in each cell $302_0$–$302_8$ sums these successive first stage results as math unit calculates them.

With reference now to FIG. 3, when series 303 has been fully delivered, each accumulator 603's current value is the output result $O_0$–$O_8$ for the corresponding cell $302_0$–$302_8$. Since all cells $302_0$–$302_8$ operate simultaneously on series 303, the completion of delivery of series 303 allows result surface 231 (as shown on FIG. 2D) to be know immediately. The inventive correlator may then analyze result surface 231 to derive a correlation value therefrom, typically (although not mandatorily) by adopting the numerical value of the numerically smallest output result $O_0$–$O_8$ on result surface 231.

The inventive correlator thereby achieves the advantages set forth in the previous section. Processing time for correlation calculations is reduced dramatically since, in the example described above with reference to FIG. 3, nine calculations are made concurrently. Further, compare pixel values are presented just once in a series, used for nine calculations executed concurrently, and are then finished with. Passing the series once through the architecture enables complete calculation of the output surface. Moreover, with further reference to FIGS. 3 and 5A–5C, depending on the order of series 303 (which in turn determines the order of corresponding tagged reference pixel values 202 delivered to each cell $302_0$–$302_8$), further low latency advantage may be gained by passing reference pixel values from cell to cell between compare pixel value deliveries rather than refreshing from reference memory 301 each time. It will be appreciated that, for example, reference pixel value $202_{11}$ may be required at cell $302_4$ at the delivery of compare pixel value $212_3$, and at cell $302_3$ at the delivery of compare pixel value $212_4$. Reference pixel value $202_{11}$ may thus be simply passed from cell $302_4$ to cell $302_3$ in between deliveries of compare pixel values $212_3$ and $212_4$ instead of looking to reference memory 301 to refresh cell $302_3$. It will be seen that numerous such other cell-to-cell transfers are possible during delivery of series 303. This cell-to-cell transfer capability further reduces processing overhead, contributing to a lower latency correlator enabled on simplified architecture.

Further, hardware requirements are optimized by the inventive correlator. Only one memory region is needed (for the reference array), which must be structured and tagged to deliver the appropriate reference pixel values to the appropriate cell at the correct time. The cells, each including a pipe, math unit and accumulator, are standard DSP architecture. Accordingly, the inventive correlator may be embodied in a DSP deployed on a unitary integrated circuit chip.

Although the present invention and its advantages have been described in detail, it should be understood that various changes, substitutions and alterations can be made herein without departing from the spirit and scope of the invention as defined by the appended claims.

I claim:

1. A method for performing low latency correlation, comprising the steps of:

(a) representing a pixelated reference image as a reference array of reference pixel values and a pixelated compare image as a compare array of compare pixel values, wherein the compare array is not greater in any dimension than the reference array and is smaller than the reference array in at least one dimension;

(b) indexing movement of the compare array over the reference array to an result surface, each different location that the compare array may be overlaid on the reference array defining a separate compare array-sized patch of overlaid reference pixel values matched to a corresponding output result on the result surface, each reference pixel value in each patch tagged to a corresponding compare pixel value appearing thereabove when the compare array is overlaid thereon;

(c) one by one for all compare pixel values in the compare array, presenting a same compare pixel value simultaneously to each patch;

(d) concurrently for each of said compare pixel value presentations, computing patch values, said step (d) including the substeps of:

(i) for each patch, calculating the result of a preselected function of said presented compare pixel value and its corresponding tagged reference pixel value; and (ii) for each patch, summing said results;

(e) successively for compare pixel values presented in step (c), accumulating patch values computed in step (d) separately for each patch, each patch's separate patch value accumulations forming the output result matched to the patch; and (f) when patch values have been accumulated in step (e) for all compare pixel values presented according to step (c), identifying a correlation value by analyzing said result surface according to predetermined criteria.

2. The method of claim 1, in which step (f) includes the substep of:

adopting as the correlation value the numerical value of the numerically smallest output result on the result surface.

3. The method of claim 1, in which steps (a) through (f) are performed on a unitary integrated circuit chip.

4. The method of claim 1, in which the preselected function in step (d)(i) is the absolute value of the numeric difference between said presented compare pixel value and its corresponding tagged reference pixel value.

5. The method of claim 1, in which the preselected function in step (d)(i) is the square of the numeric difference between said presented compare pixel value and its corresponding tagged reference pixel value.

6. A method for performing low latency correlation on a unitary integrated circuit chip, comprising the steps of:

(a) representing a pixelated reference image as a reference array of reference pixel values and a pixelated compare image as a compare array of compare pixel values, wherein the compare array is not greater in any dimension than the reference array and is smaller than the reference array in at least one dimension;

(b) indexing movement of the compare array over the reference array to an result surface, each different location that the compare array may be overlaid on the reference array defining a separate compare array-sized patch of overlaid reference pixel values matched to a corresponding output result on the result surface, each reference pixel value in each patch tagged to a corresponding compare pixel value appearing thereabove when the compare array is overlaid thereon;

(c) one by one for all compare pixel values in the compare array, presenting a same compare pixel value simultaneously to each patch;

(d) concurrently for each of said compare pixel value presentations, computing patch values, said step (d) including the substeps of:
  (i) for each patch, calculating the result of a preselected function of said presented compare pixel value and its corresponding tagged reference pixel value; and
  (ii) for each patch, summing said results; wherein the preselected function is selected from the group consisting of:
    (A) the absolute value of the numeric difference between said presented compare pixel value and its corresponding tagged reference pixel value; and
    (B) the square of the numeric difference between said presented compare pixel value and its corresponding tagged reference pixel value;
(e) successively for compare pixel values presented in step (c), accumulating patch values computed in step (d) separately for each patch, each patch's separate patch value accumulations forming the output result matched to the patch; and
(f) when patch values have been accumulated in step (e) for all compare pixel values presented according to step (c), adopting as a correlation value the numerical value of the numerically smallest output result on the result surface.

7. An integrated circuit chip including an on-chip digital signal processor (DSP) for performing low-latency correlation, the DSP comprising:
  means for representing a pixelated reference image as a reference array of reference pixel values;
  means for representing a pixelated compare image as a compare array of compare pixel values, the compare array not greater than the reference array in any dimension and smaller than the reference array in at least one dimension;
  means for indexing movement of the compare array over the reference array to an result surface, each different location that the compare array may be overlaid on the reference array defining a separate compare array-sized patch of overlaid reference pixel values matched to a corresponding output result on the result surface, each reference pixel value in each patch tagged to a corresponding compare pixel value appearing thereabove when the compare array is overlaid thereon;
  means for serially presenting all compare pixel values in the compare array individually to each patch, wherein, at each of said presentations in said series, said presented individual compare pixel value is presented simultaneously to each patch;
  means, responsive to each of said presentations of an individual compare pixel value in said series thereof to each patch, for concurrently computing patch values, the means for computing including, for each patch:
    means for calculating the result of a preselected function of said presented compare pixel value and its corresponding tagged reference pixel value; and
    means for summing said results;
  means, responsive to each of said computations of patch values for an individual compare pixel value in said series thereof, for accumulating patch values separately for each patch, each of said separate patch value accumulations forming the output result matched to the patch; and
  means, responsive to accumulation of all patch values computed for all compare pixel values in said series thereof, for identifying a correlation value, the means for identifying including means for analyzing said result surface according to predetermined criteria to derive the correlation value.

8. The DSP of claim 7, wherein the preselected function is selected from the group consisting of:
  (i) the absolute value of the numeric difference between said presented individual compare pixel value and its corresponding tagged reference pixel value; and
  (ii) the square of the numeric difference between said presented individual presented compare pixel value and its corresponding tagged reference pixel value.

9. Computer architecture for performing low-latency correlation between a pixelated reference image represented as a reference array of reference pixel values and a pixelated compare image represented as a compare array of compare pixel values, wherein the compare array is not greater in any dimension than the reference array and is smaller than the reference array in at least one dimension, the architecture comprising:
  a reference memory storing the reference array and organizing the reference array into a plurality of separate predetermined compare array-sized patches of reference pixel values, each of the patches being the reference pixel values covered by the compare array when the compare array is overlaid at a different one of all possible locations on the reference array, each reference pixel value in each patch tagged to a corresponding compare pixel value appearing thereabove when the compare array is overlaid thereon;
  a plurality of calculation cells each assigned to a corresponding one of the patches, each cell further disposed to yield an output result on a result surface describing movement of the compare array over the reference array;
  the plurality of calculation cells further disposed to operate concurrently;
  means for delivering a series of all compare pixel values in the compare array once to each of the plurality of calculation cells, individual compare pixel values in the series delivered simultaneously to all calculation cells;
  each cell in the plurality further coupled to the reference memory and disposed, concurrently with said receipt of each compare pixel value in the series, to also receive its tagged reference pixel value corresponding thereto, each cell further including:
    a math unit for calculating first stage results, each first stage result being the result of a separate calculation of a preselected function of each tagged reference pixel value and the corresponding compare pixel value; and
    an accumulator for numerically summing successive first stage results;
  means for extracting, when the series has been fully delivered, each accumulator's current value as the output result for the corresponding cell; and
  means, responsive to the means for extracting, for analyzing the result surface to derive a correlation value therefrom.

10. The architecture of claim 9, in which each cell further comprises a delay pipe for delaying delivery of tagged reference pixel values to the math unit until receipt at the math unit of their corresponding compare pixel values.

11. The architecture of claim 9, in which the preselected function is programmable.

12. The architecture of claim 9, in which the preselected function is selected from the group consisting of:

(i) the absolute value of the numeric difference between a tagged reference pixel value and its corresponding compare pixel value; and (ii) the square of the numeric difference between a tagged reference pixel value and its corresponding compare pixel value.

13. The architecture of claim 9, in which the means for analyzing includes:

means for adopting as the correlation value the numerical value of the numerically smallest output result on the result surface.

14. The architecture of claim 9, in which the calculation cells are coupled together such that each cell may receive successive tagged reference pixel values from either the reference memory or another cell.

* * * * *